No. 711,291. Patented Oct. 14, 1902.
L. D. COPELAND.
SLAG STEAM GENERATOR.
(Application filed Mar. 13, 1902.)
(No Model.) 2 Sheets—Sheet 2.
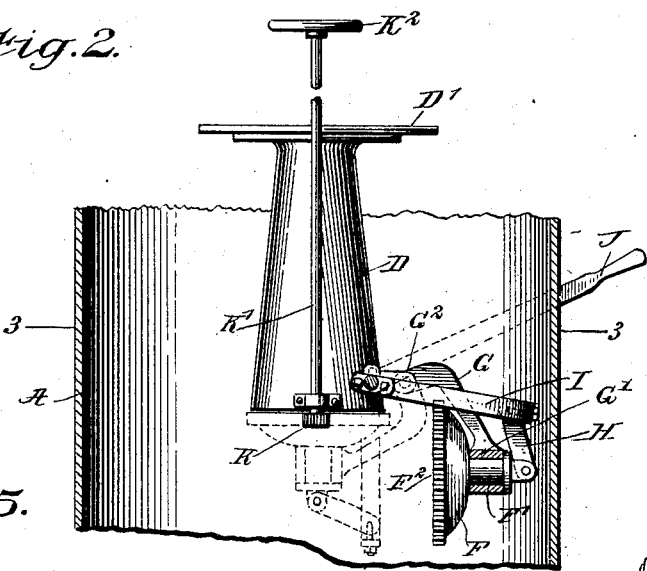
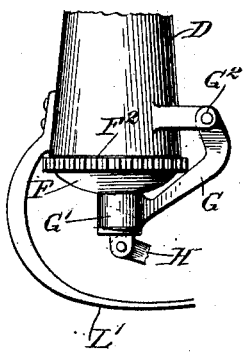
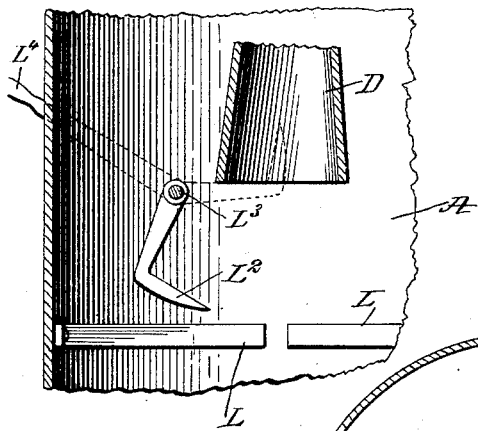
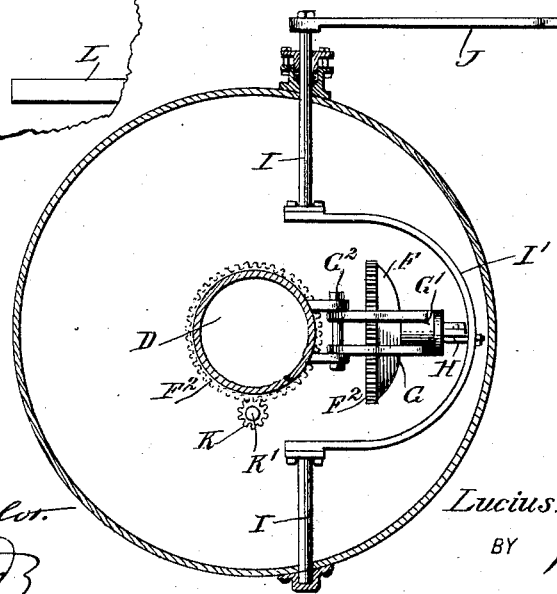
WITNESSES:
Geo. W. Taylor
Revj. Horsted
INVENTOR
Lucius D. Copeland
BY
Munn
ATTORNEYS

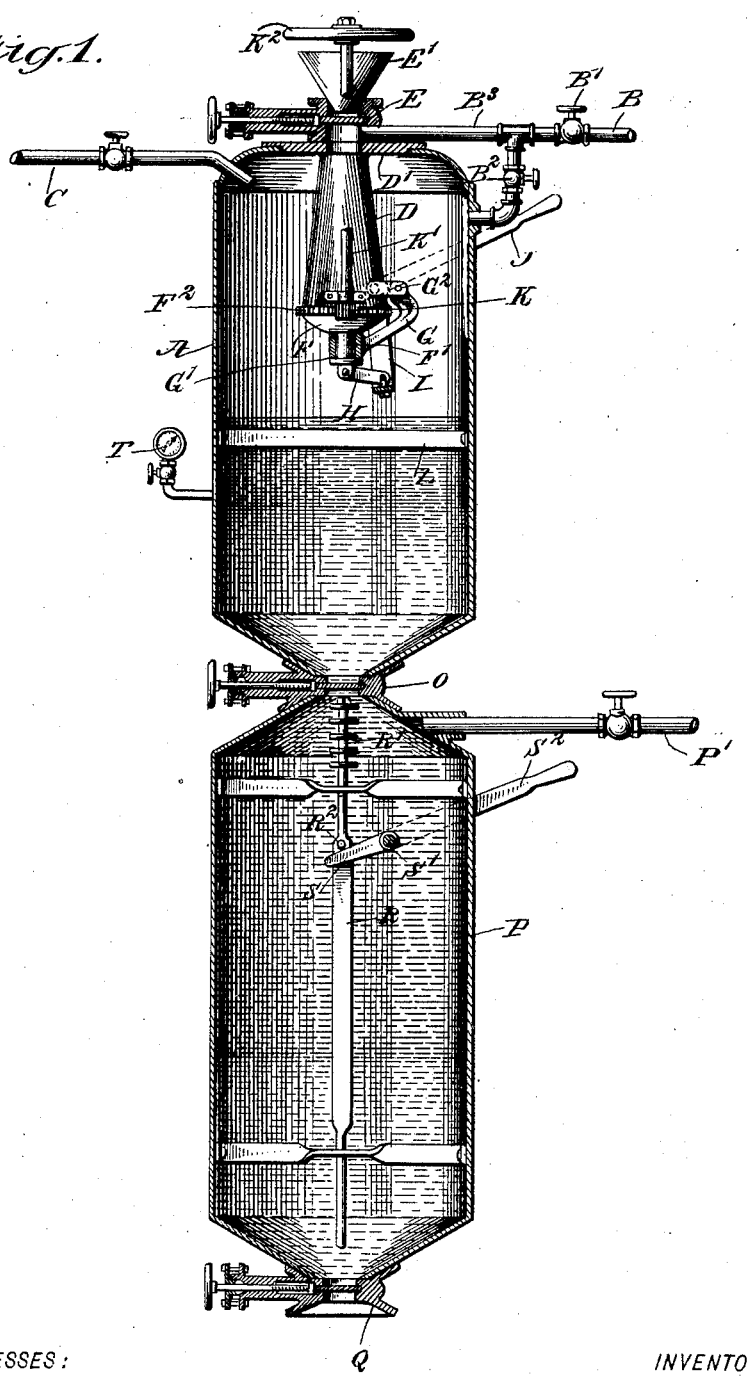

UNITED STATES PATENT OFFICE.

LUCIUS DAY COPELAND, OF LOS ANGELES, CALIFORNIA, ASSIGNOR OF ONE-HALF TO GEORGE MITCHELL, OF LOS ANGELES, CALIFORNIA.

SLAG STEAM-GENERATOR.

SPECIFICATION forming part of Letters Patent No. 711,291, dated October 14, 1902.

Application filed March 13, 1902. Serial No. 97,989. (No model.)

*To all whom it may concern:*

Be it known that I, LUCIUS DAY COPELAND, a citizen of the United States, and a resident of Los Angeles, in the county of Los Angeles and State of California, have invented a new and Improved Slag Steam-Generator, of which the following is a full, clear, and exact description.

The invention relates to steam-generators in which molten or hot slag is brought in contact with water to generate steam.

The object of the invention is to provide a new and improved slag steam-generator arranged to permit proper feeding of the slag into the receiving-receptacle contained in the closed generator and to allow ready emptying of the contents of the receiving-receptacle and breaking up or dividing the slag to insure utilization of all the units of heat contained in the slag.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is an enlarged sectional side elevation of part of the generator and the receiving-receptacle in an open position for discharging the slag into the generator. Fig. 3 is a sectional plan view of the same on the line 3 3 of Fig. 2. Fig. 4 is a side elevation of the discharge end of the slag-receiving receptacle, showing a modified form of the breaking-up or dividing device for the slag on leaving the receptacle; and Fig. 5 is a sectional side elevation of another modified form of the same.

From the upper end of the generator-casing A, containing the water to be converted into steam, leads a steam-pipe C for carrying off the generated steam to other machinery. In the upper end of the generator-casing A is suspended a fixed slag-receiving receptacle D, preferably in the shape of a frustum of a cone and provided at its upper end with a flange D′, secured to the apertured top of the generator-casing A, as will be readily understood by reference to Fig. 1. Into the upper end of the receiving-receptacle D opens a feeding or charging device E, preferably in the shape of a gate-valve, as indicated in Fig. 1, and adapted to support a funnel E′, into which the molten or hot slag is poured at the time of recharging the receptacle D, as hereinafter more fully described. The lower end of the receiving-receptacle D is adapted to be closed and opened by a valve F in the shape of a hinged bottom, the said valve F having on its under side a depending stud F″, mounted to rotate in a bearing G′, held on the free end of a link G, fulcrumed at $G^2$ on the outside of the receptacle D to allow the valve F to swing open and closed and to permit the valve to be rotated when moving to its seat on the lower end of the receptacle D. The bottom of the bearing G′ is connected by a link H with a crank I′ of a shaft I, journaled in suitable bearings in the side of the casing A, one outer end of the shaft I carrying a lever J under the control of the operator to impart a turning motion to the said shaft I and cause the crank I′ thereof and link H to swing the valve F into an open or closed position. In order to insure a firm seating of the valve F on the lower end of the receptacle D, I provide the same with a gear-wheel $F^2$, adapted to move in mesh with a pinion K, held on the lower end of a shaft K′, extending upwardly through the flange D′ to carry on its outer end a hand-wheel $K^2$, adapted to be turned by the operator to rotate the shaft K′ and pinion K, to turn the gear-wheel $F^2$, and cause the valve F to grind to its seat.

Directly below the slag-receptacle D is arranged a bar L, extending in the path of the slag discharged from the receptacle D on opening the valve F, so that the said slag is broken up and divided to insure contact of the water with all the particles of the slag to utilize the units of heat contained in the slag to the fullest advantage.

In order to equalize the pressure between the upper and lower ends of the slag-receptacle D at the time the gate-valve is closed and the valve F is to be opened, I provide the following device: The water-equalizing pipe B is provided with two valves B′ and $B^2$ and with a branch pipe B³, leading to the upper end of the slag-receptacle D, so that when the valve B' is closed and the valve B² is open then communication is established between the inside of the casing A and the upper end of the slag-receptacle D to allow the steam contained in the casing to press equally on the slag within the receptacle and the under side of the valve F, so that the latter can be readily opened by the operator working the lever J correspondingly. After the valve F is opened and closed the operator closes the valve B² and opens the valve B' to allow the steam to flow into the open air or into a tank for heating feed-water. The lower end of the generator-casing A is connected by a gate-valve O with a vessel P, in which the slag and the water not converted into steam can accumulate, and in this vessel P is mounted to slide vertically a rod R, having its upper end R' extending centrally in the opening of the gate-valve O, so that when the gate-valve is opened and the bar R is moved upward then the upper end R' passes through the gate-valve opening into the slag that has accumulated in the lower end of the generator-casing A, and this slag is readily broken up by the end R', so as to readily flow through the gate-valve O into the vessel P. In order to impart a desired motion to the bar R, I provide the same with a pin R², engaged by an arm S, extending from a shaft S', journaled in the sides of the vessel P, and one outer end of this shaft S' is provided with a handle S² under the control of the operator for imparting a turning motion to the shaft S' to cause the arm S to lift the bar R for the purpose above mentioned. The water and slag accumulating in the vessel P is discharged from the lower end thereof periodically through a suitable gate-valve Q or other device. The vessel P and generator-casing A are charged with water at the time the valve O is open through a water-feed pipe P'.

The generator-casing A is provided with a suitable pressure-gage T to indicate the pressure of the steam within the generator.

The device is used as follows: In order to fill the slag-receptacle D with molten or hot slag, the valve F is first moved into a closed position, and then the gate-valve of the feeding or charging device E, is opened, and the molten slag is now poured into the funnel E' to run through the charging device into the receptacle D. When the receptacle D is filled or charged with molten or hot slag, then the gate-valve in the feeding device E is closed, and pressure is now equalized on the upper end of the receptacle D and the bottom of the valve F, as previously explained, and then the lever J is actuated to swing the valve F into an open position. The molten or hot slag contained in the receptacle D now readily drops out of the same and comes in contact with the bar L, which breaks or divides the slag, so that the water with which the slag now comes in contact is quickly converted into steam. The slag in granulation accumulates with the water not converted into steam in the lower portion of the generator A and is discharged therefrom from time to time by the operator opening the gate-valve O. After the receptacle D is emptied of its contents then the valve F is again closed and the above-described operation is repeated—that is, the receptacle D is again charged with slag through the feeding device.

Instead of the bar L, attached to the generator-casing A, I may employ a bar L', attached to the receptacle D, as indicated in Fig. 4, or I may employ a pick L², secured on a shaft L³, journaled in the sides of the generator-casing and carrying at one outer end a handle L⁴ under the control of the operator. (See Fig. 5.) Now by this arrangement the pick L² can be swung into the path of the slag and also into the lower end of the receptacle D, so as to break the slag in case the same has become unduly hardened and does not flow readily from the receptacle.

Having thus described my invention, I claim as new and desire to secure by Letters Patent—

1. A slag steam-generator having a generator-casing, a slag-receiving receptacle suspended therein, a valved feed device for discharging slag directly into the said receptacle at the upper end, and means for discharging the slag into the generator-casing from the lower end of the said receptacle, as set forth.

2. A slag steam-generator having a generator-casing, a slag-receptacle suspended within the casing and in the shape of a frustum of a cone, a feed device for discharging slag directly into the upper end of the said receptacle, and a movable closure for the lower end of the receptacle, as set forth.

3. A slag steam-generator having a generator-casing, a slag-receiving receptacle therein, and a hinged closure for the lower end of the receptacle into the generator, as set forth.

4. A slag steam-generator having a generator-casing, a slag-receiving receptacle therein, and a hinged closure for the lower end of the receptacle, the said closure being controlled from the outside of the generator-casing, as set forth.

5. A slag steam-generator having a generator-casing, and a slag receiving and discharging receptacle within the said casing, said receptacle being open at one end to receive the slag and provided at the other end with a hinged bottom for retaining the same in the receptacle during the filling operation, and means for swinging the bottom to discharge the slag from the receptacle into the casing, as set forth.

6. A slag steam-generator having a generator-casing, a slag receiving and discharging receptacle within the said casing, said receptacle being open at one end to receive the slag and provided at the other end with means for retaining the same in the receptacle during the filling operation, and for discharging the slag from the receptacle into the casing, and a slag breaking up or dividing device for breaking up the slag in the receptacle, as set forth.

7. A slag steam-generator having a generator-casing, a slag receiving and discharging receptacle within the said casing, said receptacle being open at one end to receive the slag and provided at the other end with means for retaining the same in the receptacle during the filling operation, and for discharging the slag from the receptacle into the casing, and a slag breaking up or dividing device arranged below the discharge end of the said receptacle, as set forth.

8. A slag steam-generator having a generator-casing, a slag receiving and discharging receptacle within the said casing, said receptacle being open at one end to receive the slag and provided at the other end with means for retaining the same in the receptacle during the filling operation, and for discharging the slag from the receptacle into the casing, said means consisting of a valve mounted to swing and rotate, as set forth.

9. A slag steam-generator having a generator-casing, a slag receiving and discharging receptacle within the said casing, said receptacle being open at one end to receive the slag and provided at the other end with means for retaining the same in the receptacle during the filling operation, and for discharging the slag from the receptacle into the casing, said means consisting of a valve mounted to swing and rotate, and means for opening and closing the said valve and rotating the same from the outside of the generator-casing, as set forth.

10. A slag steam-generator having a generator-casing, a slag receiving and discharging receptacle within the said casing, said receptacle being open at one end to receive the slag and provided at the other end with means for retaining the same in the receptacle during the filling operation, and for discharging the slag from the receptacle into the casing, said means consisting of a valve for closing and opening the discharge-opening of the said slag-receptacle, means for opening and closing the said valve, and means for rotating the said valve as the latter moves to its seat, as set forth.

11. In a slag steam-generator, a generator-casing, a slag-receptacle suspended in the casing and having an open upper end, and a swinging bottom for the lower end of the receptacle, said bottom being mounted to rotate as it moves to its seat, as set forth.

12. In a slag steam-generator, a generator-casing, a slag-receptacle suspended in the casing and having an open upper end, a swinging support carried by the receptacle, a bottom mounted to rotate in the support, and means for swinging the said support and rotating the bottom from the outside of the generator-casing, as set forth.

13. In a slag steam-generator, a generator-casing, a slag-receptacle having a valved bottom, and a pivoted slag-breaking device adapted to be swung below the receptacle or into the lower end of the same when the bottom is open, as set forth.

14. In a slag steam-generator, a generator-casing, means for discharging molten slag into said casing, a vessel arranged below the generator-casing and having a valved connection therewith, and a vertically-sliding rod mounted in the vessel and adapted to be moved up through the opening of the said valve into the lower end of the generator-casing, as set forth.

15. The combination with a steam-generator and means for conveying molten or heated slag into the generator, of two valves constructed and arranged to regulate and control the flow of molten or heated slag into water under pressure in the generator, substantially as set forth.

16. The combination of a steam-generator, a hopper or funnel for receiving the molten or heated slag, a valve for controlling the feed of the slag from said hopper into a slag-receptacle, and a valve for controlling the feed of the slag from said receptacle into the generator, substantially as set forth.

17. The combination with a generator, and a slag-receptacle having converging walls, and projecting into the steam-generator, of a valve at the lower end of the receptacle for regulating the discharge of slag from the same into the generator, and a valve at its upper end for closing it when the slag enters the generator, substantially as set forth.

18. The combination with a steam-generator, a receptacle for feeding slag into the water contained in the generator, and a valve at the lower end of the receptacle for regulating the discharge of slag therefrom, of means for dislodging any slag or clog in the receptacle, substantially as set forth.

19. The combination with a steam-generator, a receptacle for feeding slag into the water contained in the generator, and a valve at the lower end of the receptacle, for regulating the discharge of slag therefrom, of a bar or hook located inside the steam-generator, and means for moving it into and out of the lower end of the receptacle to dislodge any slag that may clog or stick therein, substantially as shown.

In testimony whereof I have signed my name to this specification in the presence of two subscribing witnesses.

LUCIUS DAY COPELAND.

Witnesses:
EFFIE L. STEPHENSON,
BARTON DARLINGTON.